US005695143A

United States Patent [19]
Gerfast

[11] Patent Number: 5,695,143
[45] Date of Patent: Dec. 9, 1997

[54] BELT-DRIVEN TAPE CARTRIDGE HAVING AN IDLER ROLLER NEAR EACH CORNER

[75] Inventor: Sten R. Gerfast, Mendota Heights, Minn.

[73] Assignee: Imation Corp., Oakdale, Minn.

[21] Appl. No.: 260,059

[22] Filed: Jun. 15, 1994

[51] Int. Cl.⁶ .................................................. G11B 23/087
[52] U.S. Cl. ........................ 242/342; 242/352.4; 360/132
[58] Field of Search ........................... 242/352.4, 340, 242/342; 360/132, 96.1, 96.3

[56] References Cited

U.S. PATENT DOCUMENTS

| 1,942,890 | 1/1934 | Wittel | 242/352.4 |
|---|---|---|---|
| 3,125,311 | 3/1964 | Willis | 242/352.4 |
| 3,305,186 | 2/1967 | Burdorf et al. | 242/55.12 |
| 3,692,255 | 9/1972 | von Behren | 242/192 |
| 3,942,743 | 3/1976 | Jensenji | 242/192 |
| 4,139,873 | 2/1979 | Maxey | 360/85 |
| 4,199,794 | 4/1980 | Pfost et al. | 360/92 |
| 4,242,709 | 12/1980 | Stricker | 360/96.4 |
| 4,262,860 | 4/1981 | Hurtig et al. | 242/192 |
| 4,447,019 | 5/1984 | Nagorski | 242/192 |

FOREIGN PATENT DOCUMENTS

| 0 022 651 | 1/1981 | European Pat. Off. |  |
|---|---|---|---|
| 55-097046 | 7/1980 | Japan . |  |
| 55-97046 | 7/1980 | Japan | 242/352.4 |
| 58-070465 | 4/1983 | Japan . |  |
| 658 330 | 10/1986 | Switzerland . |  |

Primary Examiner—John Q. Nguyen
Attorney, Agent, or Firm—Charles L. Dennis, II

[57] ABSTRACT

The belt of a rectangular two-reel tape cartridge is stretchably entrained around the tape packs, a single belt-driving roller, and four idler rollers. Each idler roller is positioned near a corner of the cartridge so that the belt has an angle of wrap of at least 150 degrees at the periphery of each of the tape packs. Such angle of wrap permits the cartridge to employ magnetic recording tape that has a smoother backside and yet avoids read/write errors at high tape speeds.

14 Claims, 1 Drawing Sheet

BELT-DRIVEN TAPE CARTRIDGE HAVING AN IDLER ROLLER NEAR EACH CORNER

BACKGROUND OF THE INVENTION

1. Field of the Invention

The invention relates to a two-reel tape cartridge wherein an elastic belt is entrained around the tape packs to drive the tape tangentially.

2. Description of the Related Art

Coassigned U.S. Pat. No. 3,692,255 (Von Behren) discloses a two-reel tape cartridge having a boxlike rectangular enclosure in which an elastic belt is driven by a reversible motor to drive the tape bidirectionally. The belt is stretchably entrained around the tape packs, a single belt-driving roller adjacent a first edge of the enclosure, and a pair of idler rollers (e.g., belt guide rollers 29 and 30 of FIGS. 1–2) which are journalled on fixed pins near corners of the cartridge at either end of a second edge that extends parallel to the first edge. The belt-driving roller and idler rollers define a belt guide path having an angle of wrap of at least 60 degrees at the periphery of the tape packs. A predetermined frictional coupling between the idler rollers and their pins applies a predetermined drag to the belt so that the belt drives the tape faster at the take-up pack than it does at the supply pack, thus applying tension to and taking up any slack that might otherwise develop in the tape while it is being driven past a cutaway portion of the enclosure which affords access to the head of a recording device. Such tension should be sufficient to keep the tape in contact with the head. Where the tape contacts the head of a recording device, it is out of contact with the belt. (Disclosure of the Von Behren patent is incorporated herein by reference.)

Because tape cartridges of the Von Behren patent are used for recording data, they are commonly called "data cartridges." One such data cartridge that is currently marketed by the company to which this application is assigned, is equipped with magnetic recording tape having a width of ¼ inch (6.35 mm) and a backing thickness of 260 microinches (6.6 µm). Because a recording device may record as many as 45 longitudinal tracks on the tape, it must be evenly wound to avoid lateral movement while being drawn across the head of a recording device. While the tape has a mirror-like recording surface to permit data to be recorded at high densities, e.g., 40,000 flux transitions per inch (1,575 flux transitions per mm), its backside has a relatively rough coating to ensure sufficient frictional contact between the tape and the belt to obtain even winding and uniform tape travel across the head. Unfortunately, very thin tapes have encountered read/write errors which have been attributed to the roughness of the backside coating, but heretofore it has not been possible to make the tape backside more smooth without experiencing winding problems.

Some users of "Von Behren"-type data cartridges would also like to employ higher tape speeds, but speeds substantially higher than 120 inches per second (3 m/sec) have resulted in scatterwind and read/write errors, regardless of the degree of roughness of the tape backside.

U.S. Pat. No. 4,447,019 (Nagorski) shows in FIG. 1 a prior belt-driven, two-reel tape cartridge which is similar to that shown in the Von Behren patent. The Nagorski cartridge differs from the "Von Behren" cartridge by adding idler rolls to guide the belt "to support the tape in the vicinity of the machine heads thereby minimizing tape bounce" (col. 2, lines 21–23). "The support provided by the belt 8 permits very thin tapes 12 to be used for recording and playing information. Without the support provided by the belt 8, the tape is required to be relatively thick in order to possess enough stiffness to prevent excessive vertical tape bounce" (col. 3, lines 61–66). As compared to that of the Von Behren patent, the endless belt of the Nagorski cartridge has a larger angle of wrap, but the patent does not attribute any advantage to so doing.

In spite of what the Nagorski patent says about "vertical tape bounce," cartridges of the Von Behren patent now on the market enjoy substantially error-free performance when equipped with tape having backings as thin as 260 microinches (6.6 µm). On the other hand, in embryonic experiments by the inventor, excessive read/write errors were experienced when a stretched belt pressed the tape against a head. In any event, to the best of the inventor's knowledge, the Nagorski cartridge has not been put on the market.

U.S. Pat. No. 3,942,743 (Jinsenji) shows in FIGS. 1–3 a belt-driven, two-reel tape cartridge wherein a stretched belt (10) is entrained around the tape packs, a belt-driving roller (2) and two idler rollers (3 and 4). As in the Nagorski patent, the belt is in contact with the tape where it contacts the head of a recording device. The cartridge of Jinsenji FIG. 4 is similar to FIG. 1 of that patent except that the belt-driving roller (44) is positioned near one of the corners. In FIG. 6 of that patent, the belt-driving roller and two idler rollers are replaced by "four guide rollers 47, 48, 49 and 50" (col. 3, lines 31–32) which may increase the angle of wrap, but the patent says nothing about the angle of wrap. The cartridge depicted in that patent is also not believed to have ever been put on the market.

U.S. Pat. No. 4,242,709 (Stricker) also concerns belt-driven, two-reel tape cartridges. In FIG. 5 of this patent, a belt (23) is stretchably entrained around the tape packs, a belt-driving roller (34), a "tensioning mechanism" consisting of three idler rollers (20, 21, 22), and two additional idler rollers (27) and (42). In FIG. 6 of Stricker, there is no belt-driving roller. The Stricker patent says that the "major difference" between the cartridges of FIGS. 5 and 6 is that in FIG. 6 "a single external drive motor capstan 68 makes direct contact with magnetic tape 80 . . . The belt 79 in this embodiment is a passive component and functions only to establish tension" (col. 7, lines 36–42). The belt of FIG. 6 is entrained around two additional idler rollers 64 and 75, thereby providing a minimum angle of wrap "of not less than 135°" (col. 7, line 48), which results in a much lower value of initial tension in the belt to be provided by the tensioning elements 206 and 208.

Other belt-driven, two-reel tape cartridges are shown in U.S. Pat. Nos. 3,305,186 (Burdorf et al.) and 4,262,860 (Hurtig et al.).

SUMMARY OF THE INVENTION

The invention provides a belt-driven, two-reel tape cartridge which, as compared to that of the Von Behren patent, can employ magnetic recording tape that has a smoother backside and yet can be substantially free from read/write errors at high tape speeds. In the novel cartridge, magnetic recording tape can be driven at speeds up to 200 inches per second (5 m/sec) without scatterwind or read/write problems.

Furthermore, preliminary testing indicates that the tape of the novel cartridge tracks the head more precisely and, hence, should permit more than 45 longitudinal tracks to be recorded on a ¼ inch (6.35 mm) tape. Testing also indicates that at equal or slightly reduced drive force the tape is under higher and more uniform tension than is the tape of the cartridge of the Von Behren patent, thus, affording better tape-to-head contact and consequently more reliable reproduction of data.

Like that of the Von Behren patent, the belt-driven tape cartridge of the invention has a boxlike enclosure containing

- a pair of reel hubs supported for rotation on spaced parallel axes,
- a length of tape in opposite directions on the reel hubs to provide two tape packs,
- a single belt-driving roller and at least two belt guides, such as idler rollers, the axes of which are parallel to the axes of the reel hubs, and
- an elastic belt which is stretchably entrained around the tape packs, the belt-driving roller and the additional belt guides, but is out of contact with the tape where the tape contacts the head of a recording device. Likewise, both cartridges include frictional means for applying a predetermined drag on said belt to provide tension on the tape as it passes between the tape packs.

The tape cartridge of the present invention differs from that of the Von Behren patent in that it has at least two additional belt guides (i.e., at least four idler rollers in all) which are so positioned that the belt has an angle of wrap of at least 150 degrees at the periphery of each of the tape packs, and preferably angles of wrap from 170 to 270 degrees. Cartridges that provide such large angles of wrap produce extraordinarily uniform tape winding as evidenced by the mirror-like appearance of the faces of the tape packs, even after being wound up at speeds up to about 200 ips (5 m/sec).

When the enclosure of the novel tape cartridge has a rectangular configuration like that of the Von Behren patent with its belt-driving roller adjacent a cutaway portion of a first edge of the enclosure, the belt can be guided by four idler rollers, each of which is journalled on a fixed pin near one of the corners of the enclosure. Such positioning of four idler rollers ensures the preferred large angles of wrap.

The elastic belt of the Von Behren patent is useful in the novel tape cartridge and, preferably, is a polyurethane belt having a coefficient of elasticity in the range from 0.005 to 0.1 m/nt m. Likewise, the belt should have a pre-tension of at least 1.5 nt, preferably from 2 to 5 nt. Also, as in the Von Behren cartridge, a frictional drag is applied to the belt, but preliminary testing indicates that the larger wrap angles allow the frictional drag to be less than that required in a tape cartridge of the Von Behren patent. Reduced frictional drag permits the drive force to be lower than was required to drive the Von Behren cartridge, thus permitting the cartridge to be driven by smaller motors that generate less heat. When the additional belt guides are idler rollers, the frictional drag can be reduced by employing smaller pins for the idler rollers and by lubricating the bearings of the idler rollers and belt-driving roller.

In the preferred embodiments hereinafter described, the tape is a magnetic recording tape. However, within the scope of the present invention, the term "tape" includes microfilm, paper webs, and other elongated flexible web material which can be transported between a pair of reels.

BRIEF DESCRIPTION OF THE DRAWINGS

The invention may be more easily understood in reference to the drawing, all figures of which are schematic. In the drawings.

DETAILED DESCRIPTION

Figure 1:
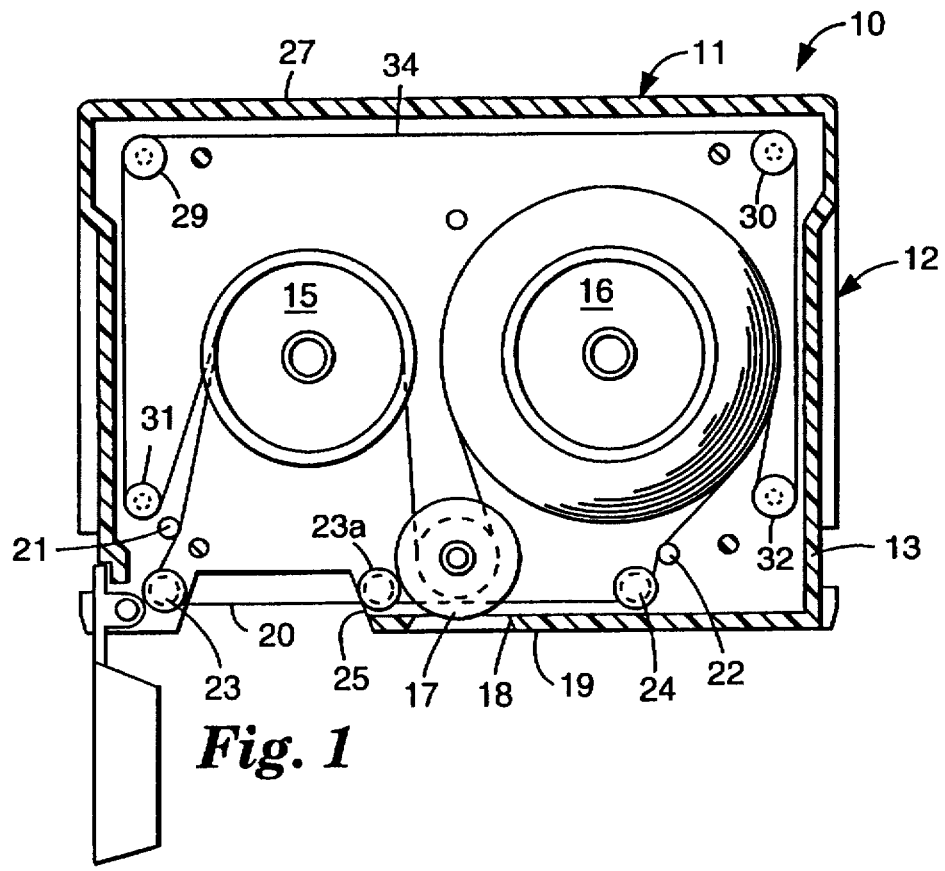
FIG. 1 is a top view of a belt-driven tape cartridge of the invention.

Referring to FIG. 1, a tape cartridge 10 has a rectangular boxlike enclosure 11 consisting of a baseplate 12 and a cover 13. Journalled on shafts projecting from the baseplate are a pair of identical fixed reel hubs 15 and 16 and a fixed belt-driving roller 17 that is positioned between the reel hubs adjacent a first cutaway portion 18 of a first edge 19 of the enclosure. The first cutaway portion 18 allows the capstan of a recording device to contact the belt-driving roller.

A length of magnetic recording tape 20 is convolutely wound on the reel hubs in opposite directions to provide two tape packs and is drawn past a pair of pins 21 and 22 and over three tape guide pins 23, 23a, and 24 to extend along the first edge 19 across said first cutaway portion 18 and a second cutaway portion 25 at which the tape can be contacted by a recording head (not shown) of a tape recorder.

Near corners of the cartridge at either end of a second edge 27 that extends parallel to the first edge 19 of the enclosure 11, first and second idler rollers 29 and 30 are journalled on fixed pins projecting from the baseplate 12. Near corners at either end of the first edge 19 are third and fourth idler rollers 31 and 32 that are identical to the first and second except that the third idler roller 31 is of slightly reduced diameter because of space constraints deemed necessary to make the tape cartridge of FIG. 1 interchangeable with the ¼ inch (6.35 mm) Von Behren tape cartridge now on the market as mentioned above. An elastic, preferably polyurethane, belt 34 is stretchably entrained around the tape packs, the belt-driving roller 17, and the idler rollers 29, 30, 31, and 32, the positions of which, as there shown, give the belt an angle of wrap of from about 170 to 230 degrees at the periphery of each of the tape packs. The pins on which the idler rollers are journalled are lubricated to maintain a predetermined drag on the elastic belt 34.

Like that in the tape cartridge of the Von Behren patent, the belt-driving roller 17 has a larger diameter portion that extends over the tape path between the guide pins 23 and 24 to be contacted by a capstan (not shown) of a tape recorder. The bearing surface of each idler roller and each belt-driving roller is crowned to keep the belt centered without edge guides.

EXAMPLE

A prototype of the belt-driven tape cartridge shown in FIG. 1 had the following significant features:

| | |
|---|---|
| baseplate 12 | aluminum |
| thickness | 2.5 mm |
| cover 13 | polycarbonate resin |
| reel hubs 15, 16 | glass-filled polycarbonate resin |
| diameter | 40 mm |
| magnetic recording tape 20 | |
| length | 300 m |
| width | 6.35 mm |
| maximum tape pack diameter | 73 mm |
| belt-driving roller 17 | |
| diameter | 17.4 mm |
| larger diameter portion | 22.6 mm |
| idler rollers 29, 30, 31, 32 | acetal resin |
| diameter of 29, 30, 32 | 10 mm |
| diameter of 31 | 8.5 mm |
| pins | hardened steel |
| diameter | 2 mm |
| elastic belt 34 | polyurethane |

| | |
|---|---|
| length | 73.7 cm |
| width | 3.5 mm |
| thickness | 0.1 mm |

The installed elastic belt had a pre-tension of 3.3 nt and minimum and maximum angles of wrap at the reel hubs of about 170 and 230 degrees, respectively. The cartridge was operated at tape speeds up to 200 ips (5.1 m/sec) and at start/stop accelerations up to 75 m/sec$^2$ while maintaining a tape tension of at least 0.17 nt throughout a large number of test cycles. At all times, both the belt and tape tracked precisely, thus producing a mirror-like appearance at the faces of the tape packs. The motor force to attain a tape speed of 2.3 m/sec was 0.7 nt.

Tested for comparison was a belt-driven tape cartridge of the Von Behren patent of the same size. Its elastic belt had a pre-tension of 4.4 nt, because a pre-tension of at least about 4.4 nt was required to prevent failure in start/stop operation at tape speeds up to 90 ips (2.3 m/sec). Even at this higher belt pre-tension (as compared to that of the cartridge of Example 1), the tape tension dropped below zero at a speed of 3.4 m/sec. The motor force to attain a tape speed of 2.3 m/sec was 0.9 nt. After being driven at tape speeds up to 90 ips (2.3 m/se), the tape packs had a mirror-like appearance, but not after being driven at tape speeds above 120 ips (3 m/sec) which resulted in tape edges protruding from the faces of the tape packs, thus evidencing scatterwind.

As compared to a belt-driven tape cartridge of the Von Behren patent, it is believed that the novel tape cartridge can be operated at lower belt tension because the greater wrap angles better guard against slippage.

Figure 2:
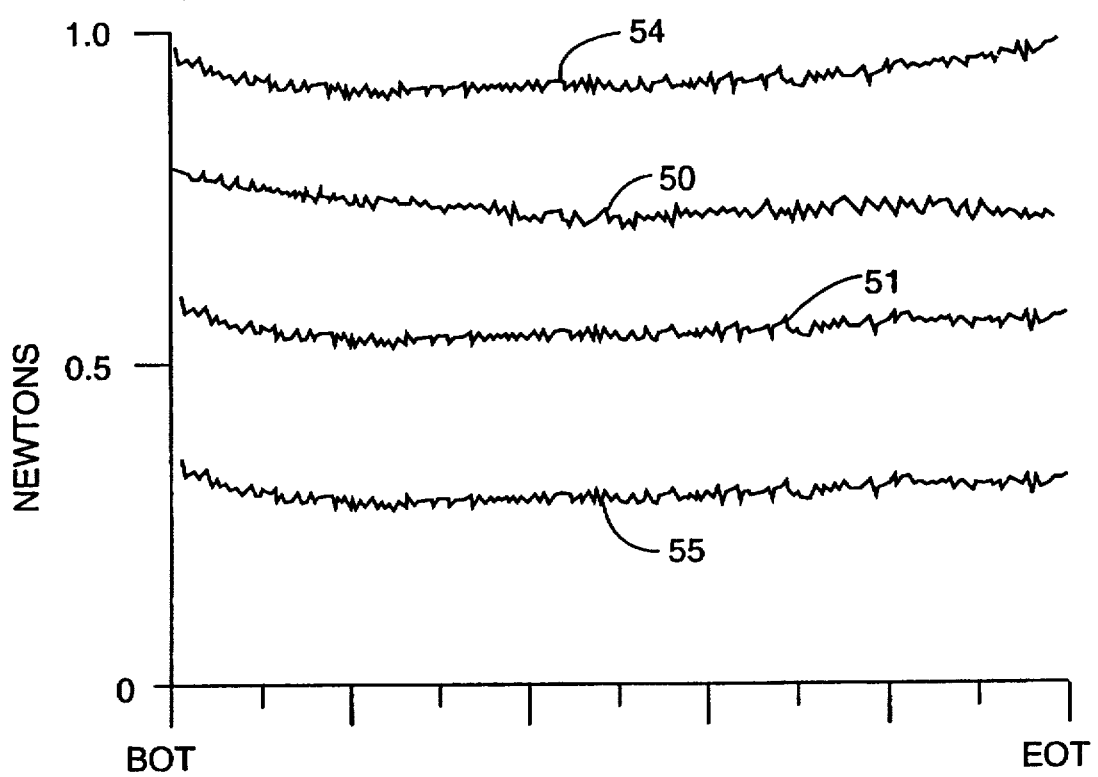
FIG. 2 is a graph comparing the driving forces and tape tensions of the tape cartridge of FIG. 1 and a tape cartridge of the Von Behren patent.

In FIG. 2, line 50 charts the driving force and line 51 charts the tape tension while driving the tape of the cartridge of the Example from one reel hub to the other at 2.3 m/sec. For comparison, line 54 charts the driving force and line 55 charts the tape tension of the cartridge of the Von Behren patent at the same tape speed. This comparison shows that the tape cartridge of the Example as compared to that of the Von Behren patent, attains higher tape tension at significantly less driving force.

To maintain uniform tape tension at the recording head, the tape tension ideally remains constant from BOT to EOT and back. Comparison of lines 50 and 54 shows that the tape cartridge of the Example came closer to this ideal than did the cartridge of the Von Behren patent.

Various changes and modifications to the embodiments of the invention as described will be readily apparent to one of ordinary skill in the art. The present invention therefore is intended to be limited only by the following claims.

What is claimed is:

1. A tape cartridge comprising a boxlike enclosure containing:
    a pair of reel hubs supported for rotation on respective fixed spaced parallel axes,
    a length of tape wound on the reel hubs in opposite directions to provide two tape packs and extending between the packs,
    a single belt-driving roller and at least four belt guides, and
    an elastic drive belt for controllably driving the tape, the belt being the only driving component for the tape and the single belt-driving roller being the only driving component for the belt, the belt being stretchably entrained around the tape packs, the belt-driving roller, and the belt guides, the belt being out of contact with the tape where the tape can be contacted by the head of a recording device, friction among the components in the enclosure applying a predetermined drag on said belt to develop between the tape packs a predetermined minimum tape tension, and said belt guides being positioned to give the belt an angle of wrap of at least 150 degrees at the periphery of each of the tape packs.

2. A tape cartridge as defined in claim 1 wherein said elastic belt has a coefficient of elasticity of at least 0.005 m/nt m and is stretchably entrained to have a pre-tension of at least 1.5 nt.

3. A tape cartridge as defined in claim 1, wherein said friction develops a tape tension of at least 0.15 nt at a tape speed of 2.3 m/sec.

4. A tape cartridge as defined in claim 1 wherein the belt guides are positioned to provide an angle of wrap between 170 and 270 degrees.

5. A tape cartridge as defined in claim 4 wherein each of the belt guides is an idler roller that is journalled on a fixed pin.

6. A tape cartridge as defined in claim 5 wherein said boxlike enclosure has a rectangular configuration and there is one of said idler rollers near each corner of the enclosure.

7. A tape cartridge as defined in claim 1 wherein the elastic belt is a polyurethane belt having a coefficient of elasticity in the range from 0.005 to 0.1 m/nt m.

8. A tape cartridge as defined in claim 1 wherein the elastic belt has a pre-tension of at least 1.5 nt.

9. A tape cartridge comprising a rectangular enclosure formed along a first edge with a first cutaway portion that allows access to the interior of the enclosure by a capstan of a recording device and a second cutaway portion that allows access to the interior of the enclosure by a recording head of a recording device, which enclosure contains:
    a pair of reel hubs supported for rotation on respective spaced parallel axes,
    a length of magnetic recording tape wound on the reel hubs in opposite directions to provide two tape packs, between which a length of the tape extends across said second cutaway portion,
    a single belt-driving roller positioned adjacent said first cutaway portion,
    an idler roller journalled on a fixed pin near each of the four corners of the enclosure, with the axis of each idler roller extending parallel to the axes of the reel hubs,
    an elastic drive belt for controllably driving the tape, the belt being the only driving component for the tape and the single belt-driving roller being the only driving component for the belt, the belt being stretchably entrained around the tape packs, the belt-driving roller and the idler rollers, the belt being out of contact with the tape where the tape extends across said second cutaway portion, said belt-driving roller and four idler rollers together applying sufficient drag on the belt to develop a predetermined minimum tape tension between the tape packs, and said idler rollers being positioned to give the belt an angle of wrap between 170 and 250 degrees at the periphery of each of the tape packs.

10. A tape cartridge as defined in claim 9, wherein said elastic belt has a coefficient of elasticity of at least 0.005 m/nt m and is stretchably entrained to have a pre-tension of at least 1.5 nt.

11. A tape cartridge comprising a boxlike enclosure containing:
    a pair of reel hubs supported for rotation on respective spaced parallel axes, a length of tape convolutely wound on the reel hubs in opposite directions to provide two tape packs and extending between the packs, a single belt-driving roller and at least two belt guides, an elastic drive belt for controllably driving the tape, the belt being the only driving component for the tape and the single belt-driving roller being the only driving component for the belt, the belt being stretchably entrained around the tape packs, the belt-driving roller and the belt guides, the belt being out of contact with the tape where the tape can be contacted by the head of a recording device, and friction among the components of said cartridge applying a predetermined drag on said belt to develop between the tape packs a tape tension of at least 0.15 nt at a tape speed of 2.3 m/sec, which tape cartridge is characterized by the feature that:
there are at least four of said belt guides positioned to provide an angle of wrap of at least 150 degrees at the periphery of each of the tape packs.

12. A tape cartridge as defined in claim 11 wherein the belt guides are positioned to provide of wrap between 170 and 270 degrees.

13. A tape cartridge as defined in claim 12 wherein each of the belt guides is an idler roller that is journalled on a fixed pin.

14. A tape cartridge as defined in claim 13 wherein said boxlike enclosure has a rectangular configuration and there is one of said idler rollers in an open area within the enclosure between each of the tape packs and each of the corners of the enclosure.

* * * * *